(12) United States Patent
Saito et al.

(10) Patent No.: US 6,173,027 B1
(45) Date of Patent: Jan. 9, 2001

(54) PRIMARY CONTAINMENT VESSEL

(75) Inventors: Takashi Saito; Akiro Asano; Shuji Hirono, all of Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/282,202

(22) Filed: Mar. 31, 1999

(30) Foreign Application Priority Data

Mar. 31, 1998 (JP) ................................... 10-087411

(51) Int. Cl.[7] ............................ G21C 9/008; G21C 9/012; G21C 13/028; G21C 13/036
(52) U.S. Cl. ........................... 376/283; 376/293; 376/461
(58) Field of Search ..................... 376/282, 283, 376/293, 298, 299, 461

(56) References Cited

U.S. PATENT DOCUMENTS

| | | | |
|---|---|---|---|
| 5,198,184 | * | 3/1993 | Hiramoto ............................ 376/283 |
| 5,301,215 | * | 4/1994 | Gou et al. ........................... 376/283 |
| 5,426,681 | * | 6/1995 | Aburomia ............................ 376/283 |
| 5,491,730 | * | 2/1996 | Kataoka et al. ..................... 376/283 |

FOREIGN PATENT DOCUMENTS

| | | | |
|---|---|---|---|
| 8 6059-471-B | * | 7/1979 | (JP) . |
| 0-2001-593-A | * | 1/1988 | (JP) . |
| 0-1203-996-A | * | 2/1988 | (JP) . |

* cited by examiner

Primary Examiner—Charles T. Jordan
Assistant Examiner—Kyongtaek K. Mun
(74) Attorney, Agent, or Firm—Finnegan, Henderson, Farabow, Garrett, & Dunner, L.L.P.

(57) ABSTRACT

A primary containment vessel comprises an outer peripheral concrete wall surrounding a reactor pressure vessel, a pipe arrangement of a reactor water recirculation system and other reactor systems and equipments, a mat concrete wall positioned below the outer peripheral concrete wall, a reactor pressure vessel (RPV) pedestal supporting the reactor pressure vessel, a horizontal wall joining the outer peripheral concrete wall and the RPV pedestal, upper and lower dry wells, a wet well having a suppression pool in which water is stored, an isolation member for air-tightly isolating the upper dry well and the lower dry well at a position supporting the reactor pressure vessel, vent pipe arrangement used for the upper dry well communicating the upper dry well with the suppression pool, a high pressure gas inflow member used for the upper dry well located in a communicating hole formed to the RPV pedestal so as to communicate the vent pipe used for the upper dry well with a gas phase section of the wet well, another vent pipe used for the lower dry well communicating the lower dry well with the suppression pool, and another high pressure gas inflow member used for the lower dry well, which is located in a communicating hole formed to the RPV pedestal so as to communicate the lower dry well with the gas phase section of the wet well.

14 Claims, 13 Drawing Sheets

PRIMARY CONTAINMENT VESSEL

BACKGROUND OF THE INVENTION

The present invention relates to a primary containment vessel particularly of a boiling water reactor.

In conventional boiling water reactors (BWR), an advanced boiling water reactor (ABWR) has been well known as a latest reactor. A reinforced concrete primary containment vessel (RCCV) of the ABWR will be described below with reference to the accompanying drawings.

FIG. 15 is a schematically sectional view showing a conventional ABWR. As shown in FIG. 15, a primary containment vessel 1 is provided with a reactor pressure vessel 4 which is supported on a support skirt portion 3 by means of a substantially hollow cylindrical reactor pressure vessel (RPV) pedestal 2 at the middle portion in the primary containment vessel. An outer peripheral side of the reactor pressure vessel 4 is surrounded with a hollow cylindrical outer peripheral concrete wall 5. Each lower end portion of the outer peripheral concrete wall 5 and the RPV pedestal 2 is supported on a mat concrete wall 6. The outer peripheral concrete wall 5 and the RPV pedestal 2 are joined together by means of a horizontal wall 7 at the substantially central position in a vertical direction in an illustrated state of the RPV pedestal 2.

In the reactor pressure vessel 4, an upper side from the support skirt portion 3 is surrounded by an upper dry well 8 which is a space defined (surrounded) by the outer peripheral concrete wall 5, the horizontal wall 7 and the RPV pedestal 2. On the other hand, in the reactor pressure vessel 4, a lower side from the support skirt portion 3 is surrounded with a lower dry well 9 which is a space defined (surrounded) by the mat concrete wall 6 and the RPV pedestal 2. The lower dry well 9 includes a reactor water recirculation pump and a control rod drive mechanism, which are not shown. Further, the lower dry well 9 is provided with a wet well 10 which is a space surrounded by the outer peripheral concrete wall 5, the mat concrete wall 6, the horizontal wall 7 and the RPV pedestal 2, at the outer peripheral side thereof. The wet well 10 is provided with a suppression pool or chamber 11 in which water is stored, at a half of the lower side.

The RPV pedestal 2 is provided with a communicating hole 12. The communicating hole 12 functions as a gas passageway between the upper dry well 8 and the lower dry well 9, and extends from the lower dry well 9 so as to communicate a heat exchanger cooling pipe of a reactor water recirculation pump, an electric cable of the control rod drive mechanism, an air conditioning duct, which are included in the lower dry well 9 and are not shown, with the upper dry well 8. These pipe, electric cable duct and the like are connected to the outside of the primary containment vessel via a penetration member (not shown) from the upper dry well 8.

Further, the RPV pedestal 2 is provided with a vertical vent pipe 13, which is opened to the lower dry well 9 side, at a half portion on the lower side thereof. The vertical vent pipe 13 is connected to a plurality of horizontal vent pipes 14 at the lower end side thereof. These horizontal vent pipes 14 are opened to water of the suppression pool 11. The suppression pool 11 is stored with water capable of safely absorbing a thermal energy radiated from the reactor pressure vessel 4 when an assumed accident such as a main steam pipe breakdown accident happens.

The primary containment vessel 1 is provided with a passageway which penetrates through the outer peripheral concrete wall 5, the wet well 10 and the RPV pedestal 2, and communicates the outside of the primary containment vessel 1 with the lower dry well 9. The passageway includes an equipment carrying in and out passageway 15 for carrying in and out equipments included in the lower dry well 9, and a personnel passageway 16 for workers for coming in the lower dry well 9 from the outside of the primary containment vessel 1 so that the workers (personnel) do work in the lower dry well 9. These equipment carrying in and out passageway 15 and personnel passageway 16 are provided with a scram pipe of the control rod drive mechanism (not shown) from the lower dry well 9.

FIG. 16 is a cross sectional view taken along the line XVI—XVI of FIG. 15. As shown in FIG. 16, the primary containment vessel 1 is provided with the upper dry well 8 inside the outer peripheral concrete wall 5 having an ring shape in its cross section. The upper dry well 8 becomes a state of being filled with an inert gas such as nitrogen in order to prevent an explosion of a fuel assembly when a main steam pipe breakdown accident or the like happens. An inner peripheral side of the outer peripheral concrete wall 5 is provided with the RPV pedestal 2 which is surrounded by the upper dry well 8 and has a ring shape in its cross section. Ten (10), in total, communicating holes 12 are formed along the outer periphery of the RPV pedestal 2.

FIG. 17 is a cross sectional view taken along the line XVII—XVII of FIG. 15. As shown in FIG. 17, the primary containment vessel 1 is provided with the wet well 10 inside the outer peripheral concrete wall 5 having an ring shape in its cross section. An inner peripheral side of the outer peripheral concrete wall 5 is provided with the RPV pedestal 2 which is surrounded by the wet well 10 and has a ring shape in its cross section. The RPV pedestal 2 is formed with the totaled ten (10) vertical vent pipes 13 having a circular shape in a cross section thereof. The lower dry well 9 is formed inside of the RPV pedestal 2.

Further, the primary containment vessel 1 is provided with an equipment carrying in and out passageway 15 which communicates with the outside of the primary containment vessel 1 and the lower dry well 9 and carries in and out equipments included in the lower dry well 9, and a personnel passageway 16 which is a passageway for coming in the lower dry well 9 so that the workers do work in the lower dry well 9.

In the conventional primary containment vessel constructed as described above, in the case where an accident such as a main pipe breakdown accident happens in the upper dry well 8, the upper dry well 8 and the lower dry well 9 communicate with each other, and for this reason, a steam pressure of the upper dry well 8 and the lower dry well 9 rises up. Then, when the steam pressure becomes a predetermined pressure or more, a high pressure steam is jetted into the water stored in the suppression pool 11 via the vertical vent pipe 13 communicating with the lower dry well 9 and the horizontal vent pipes 14. The jetted high pressure steam is condensed by the water stored in the suppression pool 11, so that an atmospheric pressure of the upper dry well 8 and the lower dry well 9 can be reduced.

Moreover, in the case where an accident such as a small-diameter pipe breakdown accident happens in the lower dry well 9, the upper dry well 8 and the lower dry well 9 communicate with each other. Because of this reason, a steam pressure of the upper dry well 8 and the lower dry well 9 rises up. Then, when the steam pressure becomes a predetermined pressure or more, a high pressure steam is jetted into the water stored in the suppression pool 11 via the vertical vent pipe 13 communicating with the lower dry well 9 and the horizontal vent pipes 14. The jetted high pressure steam is condensed by the water stored in the suppression pool 11, so that an atmospheric pressure of the upper dry well 8 and the lower dry well 9 can be reduced.

An inner-diameter dimension of the primary containment vessel 1 is determined in view of an outer diameter of the reactor pressure vessel 4, an arrangement space of a main steam pipe isolation valve (not shown) connecting to the reactor pressure vessel 4, etc.

Further, a height dimension of the reactor container 1 is determined in view of a height dimension of the reactor pressure vessel 4, a control rod drive mechanism (not shown) located on the bottom portion of the reactor pressure vessel 4, a height dimension of a platform for maintenance and inspection of the control rod drive mechanism or the like.

The inner diameter and height dimensions thus determined need to satisfy a design pressure of the reactor container 1 in the case where an assumed accident such as a main steam pipe breakdown accident happens.

Taking the above assumed accident into consideration, the primary containment vessel 1 is divided into a part of the sum of the upper dry well 8 and the lower dry well 9 and a part of the wet well 10, and a pressure analysis is carried out using a sum of a free space volume of the upper dry well 8 excluding a volume of built-in pipe and equipments and a free space volume of the lower dry well 9 and a free space volume of the wet well 10 as one condition of the analysis.

In the case of the conventional primary containment vessel of the ABWR in the range of 1350 MWe, an error or the like on the analysis is 15% with respect to a design pressure 3.16 $kg/cm^2g$, and therefore, this is a value satisfying the design pressure. In this case, a ratio of a free space volume of the wet well 10 to the sum of a free space volume of the upper dry well 8 and a free space volume of the lower dry well 9 is about 0.81.

However, in the case where there has been made a request to increase an electric output from the conventional range of 1350 MWe, an outer dimension and a height dimension of the reactor pressure vessel 4 are made large together with an increase of a reactor core fuel (not shown). Because of this reason, a dimension of the inner diameter and height of the primary containment vessel 1 is increased.

With an increase of the electric output, there is a need of increasing the free space volume of the upper dry well 8 and the lower dry well 9, and therefore, in proportional to the increase of the free space volume of these dry wells, the free space volume of the wet well 10 also must be increased. As a result, a dimension of an inner diameter and height of the primary containment vessel 1 is increased.

Moreover, a reactor core fuel is increased in proportional to an increase of the electric output of the reactor pressure vessel 4, and therefore, a heating value held by the reactor pressure vessel 4 is also increased. For this reason, a quantity of water stored in the suppression pool 11 is also increased in proportional substantially to an increase of the electric output. Thus, in order to keep the quantity of water, the dimension of the inner diameter and height of the primary containment vessel 1 must be increased.

SUMMARY OF THE INVENTION

An object of the present invention is to substantially eliminate defects or drawbacks encountered in the prior art mentioned above and to provide a primary containment vessel capable of satisfying a request to increase an electric output in a nuclear power plant and making compact an entire structure thereof by means of safely and relatively simple arrangement so as to improve economical or other matters.

This and other objects can be achieved according to the present invention by providing a primary containment vessel, which contains a reactor pressure vessel, pipe means of a reactor water recirculation system, other reactor systems and equipments, comprising:

an outer peripheral concrete wall surrounding the reactor pressure vessel, the pipe means of the reactor water recirculation system and the other reactor systems and equipments;

a mat concrete wall positioned, in an installed state, below the outer peripheral concrete wall so as to support the outer peripheral concrete wall;

a reactor pressure vessel (RPV) pedestal supporting the reactor pressure vessel at a substantially vertically central position of the outer peripheral concrete wall;

a horizontal wall joining the outer peripheral concrete wall and the RPV pedestal at substantially the vertically central position of the RPV pedestal;

an upper dry well surrounded by the outer peripheral concrete wall, the horizontal wall, the RPV pedestal and the reactor pressure vessel;

a lower dry well positioned below the reactor pressure vessel and surrounded by the mat concrete wall, the RPV pedestal and the reactor pressure vessel;

a wet well having a suppression pool in which water is stored;

isolating means for air-tightly isolating the upper dry well and the lower dry well at a position supporting the reactor pressure vessel;

vent pipe means used for the upper dry well, which communicates the upper dry well with the suppression pool;

high pressure gas inflow means used for the upper dry well, which is located in a communicating hole formed to the RPV pedestal so as to communicate the vent pipe means used for the upper dry well with a gas phase section of the wet well thereby to release a shielded state by an atmospheric pressure of a predetermined pressure or more in a case of an emergency and to selectively allow a gas inflow to the upper dry well from the gas phase section of the wet well;

another vent pipe means used for the lower dry well, which communicates the lower dry well with the suppression pool; and another high pressure gas inflow means used for the lower dry well, which is located in a communicating hole formed to the RPV pedestal so as to communicate the lower dry well with the gas phase section of the wet well thereby to release a shielded state by an atmospheric pressure of a predetermined pressure or more in a case of an emergency and to selectively allow a gas inflow to the lower dry well from the gas phase section of the wet well.

In preferred embodiments, the vent pipe means used for the upper dry well includes a vertical vent pipe which is vertically located in the RPV pedestal and is opened to the upper dry well side at an upper end portion thereof and a horizontal vent pipe which is connected to a lower end side of the vertical vent pipe and is opened to the water stored in the suppression pool. The vent pipe means used for the upper dry well is a vertical vent pipe which is located on an outside of the RPV pedestal and has an upper end opened to the upper dry well side and a lower end opened to the water stored in the suppression pool. The vent pipe means used for the upper dry well includes a vertical vent pipe which is vertically located in the RPV pedestal and is opened to the upper dry well side at an upper end portion thereof and a horizontal vent pipe which is connected to a lower end side of the vertical vent pipe and is opened to the water stored in the suppression pool.

The other vent pipe means used for the lower dry well includes a vertical vent pipe which is vertically located in the RPV pedestal and is opened to the lower dry well side at an upper end portion thereof and a horizontal vent pipe which is connected to a lower end side of the vertical vent pipe and is opened to the water stored in the suppression pool. The other vent pipe means used for the upper dry well includes a vertical vent pipe which is vertically located in the RPV pedestal and is opened to the lower dry well side at an upper end portion thereof and a horizontal vent pipe which is connected to a lower end side of the vertical vent pipe and is opened to the water stored in the suppression pool.

The high pressure inflow means used for the upper dry well is composed of a vacuum breaker, and the other high pressure inflow means used for the lower dry well is composed of a vacuum breaker.

The lower dry well is provided with an air conditioner used for a cooling equipment included in the lower dry well. The lower dry well has a structure to be filled with an atmospheric air so as to provide a working space in which workers breath.

The primary containment vessel may further comprise:
heat exchanger means located outside the outer peripheral concrete wall;
cooling means located outside the outer peripheral concrete wall to cool a heat of the heat exchanger means;
pipe means connecting an inlet portion of the heat exchanger means and the lower dry well; and
another pipe means connecting an outlet portion of the heat exchanger means and the wet well and being opened to a water phase section of the wet well.

The primary containment vessel may be further provided with an equipment carrying passageway which penetrates through the outer peripheral concrete wall, the wet well and the RPV pedestal and through which various equipments are carried in and out the lower dry well, a personnel passageway for workers which penetrates through the outer peripheral concrete wall, the wet well and the RPV pedestal and is constructed in a manner that the workers come in and out in order to do work in the lower dry well, and an equipment passageway which penetrates through the outer peripheral concrete wall, the wet well and the RPV pedestal and includes various pipes and cables for the lower dry well.

The equipment passageway is arranged at a predetermined angle on a horizontal plane with respect to the equipment carrying passageway and the personnel passageway. The lower dry well includes a reactor water recirculation pump and a control rod drive mechanism, and the equipment passageway is provided with a heat exchanger cooling pipe of the reactor water recirculation pump, an electric cable of the control rod drive mechanism, other electric cables of equipments included in the lower dry well and a cooling water pipe to the air conditioner used for the cooling equipments included in the lower dry well.

As described above, according to the primary containment vessel of the present invention with reference to various embodiments, the upper dry well and the lower dry well are effectively used, and it is therefore possible to meet a request to increase an electric output of a nuclear power plant and to make a primary containment vessel into a compact size by means of a safely and relatively simple structure or arrangement. Moreover, since the primary containment vessel is made into a compact size, it is possible to reduce a cost spent when constructing the nuclear power plant and to improve economics on a practical operation of the nuclear power plant.

Further, the primary containment vessel of the present invention is applicable to a nuclear power plant having the same electric output of the conventional case and it is possible to make the primary containment vessel into a compact size and to improve economics.

Furthermore, the workers or operators can come in the lower dry well during the plant operation and can perform an inspection work for equipments included in the lower dry well. Therefore, it is possible to further safely operate the plant and to improve a reliability of the plant.

The nature and further characteristic features of the present invention will be made more clear from the following descriptions made with reference to the accompanying drawings.

DESCRIPTION OF THE PREFERRED EMBODIMENTS

Preferred embodiments of a primary containment vessel according to the present invention will be described hereunder with reference to the accompanying drawings.

Further, it is to be noted that the terms or wordings representing directions, positions or the like such as "upper", "lower", "vertical", "horizontal" or the like are used herein in an installed state of a reactor container.

First Embodiment (FIG. 1 to FIG. 7)

Figure 1:
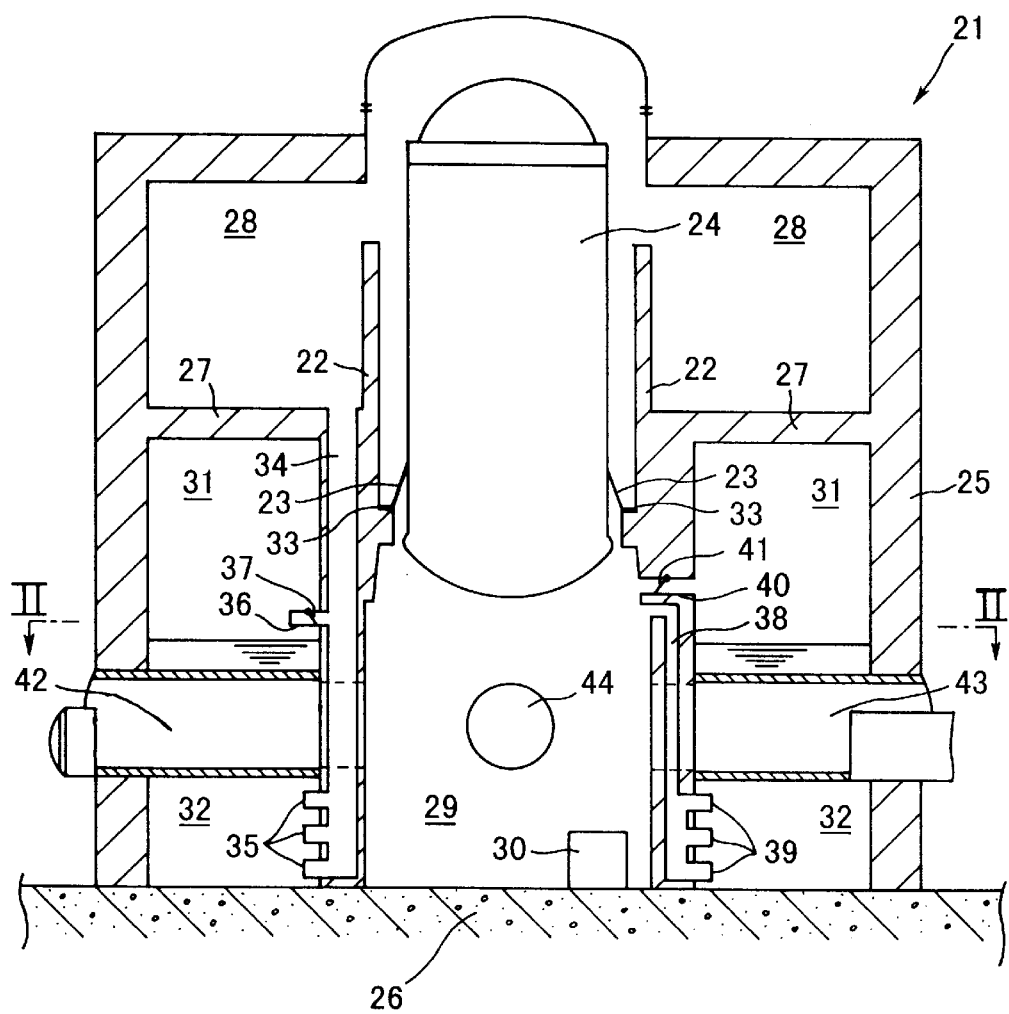
FIG. 1 is a cross sectional view schematically showing an entire structure of a primary containment vessel according to a first embodiment of the present invention.

FIG. 1 is a cross sectional view schematically showing an entire structure of a primary containment vessel according to a first embodiment of the present invention.

The primary containment vessel of this first embodiment is constructed as follows. As shown in FIG. 1, a primary containment vessel 21 is provided with a reactor pressure vessel (RPV) 24, which is supported on a support skirt portion 23 by means of a RPV pedestal 22 having a substantially hollow cylindrical shape, at the center thereof. An outer peripheral side of the reactor pressure vessel 24 is surrounded with a hollow cylindrical outer peripheral concrete wall 25. Each lower end portion of the outer peripheral concrete wall 25 and the RPV pedestal 22 is supported on a mat concrete wall 26. The outer peripheral concrete wall 25 and the RPV pedestal 22 are joined together by means of a horizontal wall 27 at the substantially central position in a vertical direction of the RPV pedestal 22.

In the reactor pressure vessel 24, an upper side from the support skirt portion 23 is surrounded by an upper dry well 28 which is a space defined by the outer peripheral concrete wall 25, the horizontal wall 27 and the RPV pedestal 22. On the other hand, in the reactor pressure vessel 24, a lower side from the support skirt portion 23 is surrounded by a lower dry well 29 which is a space defined by the mat concrete wall 26 and the RPV pedestal 22. The lower dry well 29 includes an air conditioner 30 used only for the lower dry well 29, a reactor water (coolant) recirculation pump (not shown) and a control rod drive mechanism (not shown). Further, when a plant is operated, an atmospheric air is filled in the lower dry well 29, and thereby, it is possible to use the lower dry well 29 as a space where workers can do work.

An outer peripheral side of the lower dry well 29 is provided with a wet well 31 which is a space surrounded by the outer peripheral concrete wall 25, the mat concrete wall 26, the horizontal wall 27 and the RPV pedestal 22, at the outer peripheral side thereof. The wet well 31 is provided with a suppression pool 32, in which water is stored, at a half of the lower side thereof.

The reactor pressure vessel supporting position is provided with a sealing material 33 which functions as isolating means for air-tightly isolating the upper dry well 28 and the lower dry well 29. Therefore, when the plant is operating, the upper dry well 28, the lower dry well 29 and the wet well 31 are air-tightly isolated.

The RPV pedestal 22 is provided with a vertical vent pipe 34, which is opened to the upper dry well 28 side at an upper end portion thereof, as a vent pipe used only for the upper dry well 28. The vertical vent pipe 34 is connected to a plurality of horizontal vent pipes 35 at a lower end portion thereof and the horizontal vent pipes 35 are opened to the water stored in a suppression pool 32. The suppression pool 32 is stored with water capable of safely absorbing a thermal energy radiated from the reactor pressure vessel 24 when an assumed accident such as a main steam pipe breakdown accident happens.

Further, the vertical vent pipe 34 used for only upper dry well 28 is provided with a communicating hole 36 which communicates a gas (vapor) phase section of the wet well 31 with the upper dry well 28. The communicating hole 36 is provided with a vacuum breaker 37 which functions as a high pressure gas inflow means. The vacuum breaker 37 selectively allows an inflow of an excessively high pressure gas of the gas phase section of the wet well 31 into the upper dry well 28 in an emergency.

The RPV pedestal 22 is provided with a vertical vent pipe 38, which is opened to the lower dry well 29 side at an upper end portion thereof, as a vent pipe used only for the lower dry well 29. The vertical vent pipe 38 is connected to a plurality of horizontal vent pipes 39 at a lower end portion thereof, and the horizontal vent pipes 39 are opened to the water stored in the suppression pool 32.

Furthermore, the RPV pedestal 22 is provided with a communicating hole 40 which communicates the gas phase section of the wet well 31 with the lower dry well 29. The communicating hole 40 is provided with a vacuum breaker 41 which functions as a high pressure gas inflow means. The vacuum breaker 41 selectively allows an inflow of an excessively high pressure gas of the gas phase section of the wet well 31 into the lower dry well 29 in an emergency.

The primary containment vessel 21 is provided with a passageway which penetrates through the outer peripheral concrete wall 25, the wet well 31 and the RPV pedestal 22 and communicates the outside of the primary containment vessel 21 with the lower dry well 29. The passageway includes: an equipment carrying in and out passageway 42 for carrying in and out equipments included in the lower dry well 29; a personnel passageway for workers 43 for coming in the lower dry well 29 from the outside of the primary containment vessel 21 so that the workers do work in the lower dry well 29; and an equipment passageway 44 for locating a heat exchanger cooling pipe of a reactor water recirculation pump (not shown), an electric cable for a control rod drive mechanism, electric cables of other equipments included in the lower dry well 29, a cooling water pipe to the air conditioner 30 used only for the lower dry well 29, or the like. These equipment carrying in and out passageway 42 and personnel passageway 43 are provided with a scram pipe of the control rod drive mechanism (not shown) from the lower dry well 29.

Figure 2:
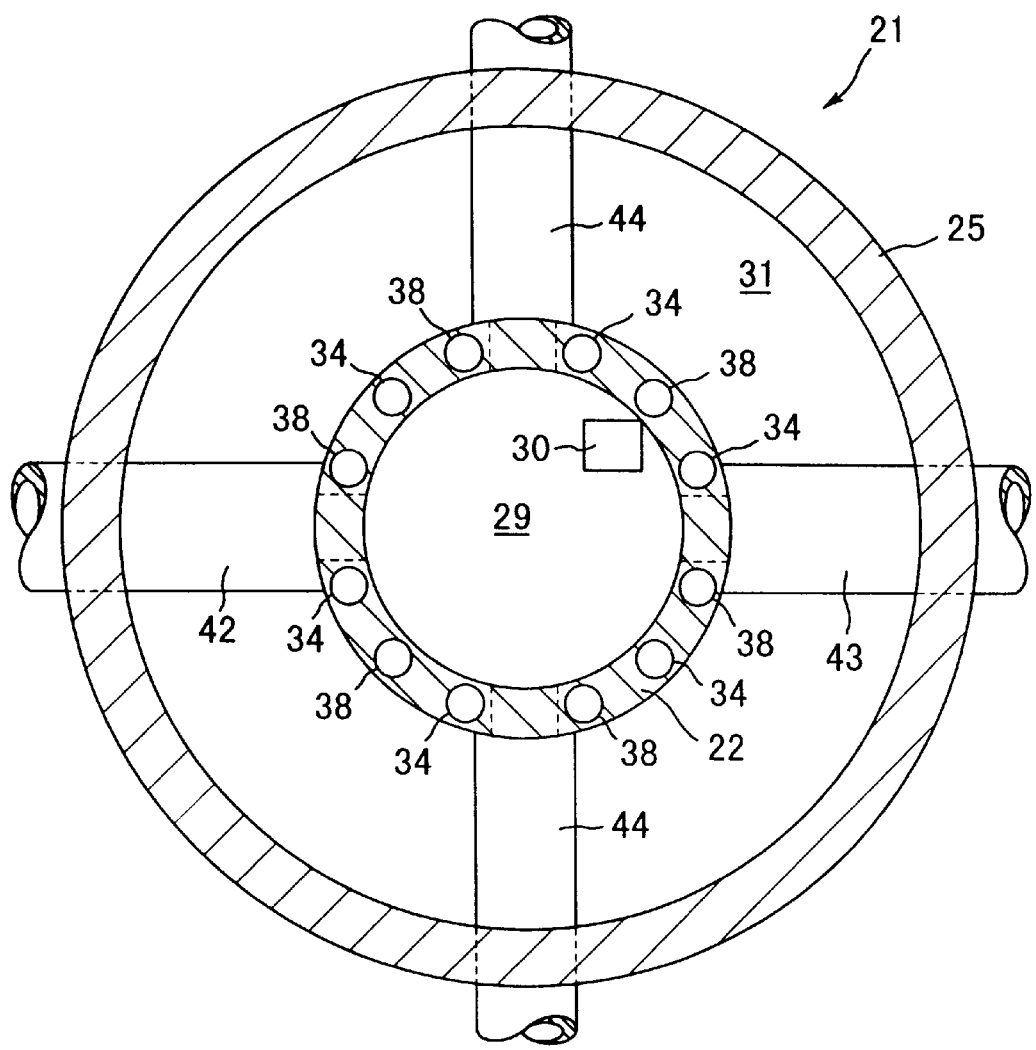
FIG. 2 is a cross sectional view taken along the line II—II of FIG. 1.

FIG. 2 is a cross sectional view taken along the line II—II of FIG. 1. With reference to FIG. 2, the primary containment vessel 21 is provided with the upper dry well 28 inside the outer peripheral concrete wall 25 having an ring shape in its cross section. An inner peripheral side of the outer peripheral concrete wall 25 is provided with the RPV pedestal 22 which is surrounded by the wet well 31 and has a ring shape in its cross section. The RPV pedestal 22 is provided with a plurality of vertical vent pipes 34 and 38 which have a circular shape in its cross section. The lower dry well 29 is formed inside the RPV pedestal 22.

The primary containment vessel 21 is provided with a passageway which penetrates through the outer peripheral concrete wall 25, the wet well 31 and the RPV pedestal 22 and communicates the outside of the primary containment vessel 21 with the lower dry well 29. The passageway includes: an equipment carrying in and out passageway 42 for carrying in and out equipments included in the lower dry well 29; a personnel passageway 43 for workers for coming in the lower dry well 29 from the outside of the primary containment vessel 21 so that the workers do work in the lower dry well 29; and two equipment passageways 44 for locating a heat exchanger cooling pipe of a reactor water recirculation pump (not shown), an electric cable for a control rod drive mechanism, electric cables of other equipments included in the lower dry well 29, a cooling water pipe to the air conditioner 30 used for only lower dry well 29, or the like. These equipment carrying in and out passageway 42 and personnel passageway 43 are provided with a scram pipe of the control rod drive mechanism (not shown) from the lower dry well 29.

In this first embodiment, the equipment carrying in and out passageway 42 and the personnel passageway 43 are coaxially located on a horizontal plane, and two equipment passageways are located in a direction perpendicular to the equipment carrying in and out passageway 42 and personnel passageway 43 on the horizontal plane. These equipment passageways 44 may be located at a predetermined angle with respect to the equipment carrying in and out passage 42 and the personnel passageway 43 on the horizontal plane. In other words, the equipments passageways 44 are located so as not to intersect the equipment carrying in and out passage 42 and the personnel passageway 43.

In the primary containment vessel 21 constructed as described above in the first embodiment, a flow of gas when an accident happens in the upper dry well 28 and the lower dry well 29 will be described below with reference to FIG. 3.

Figure 3:
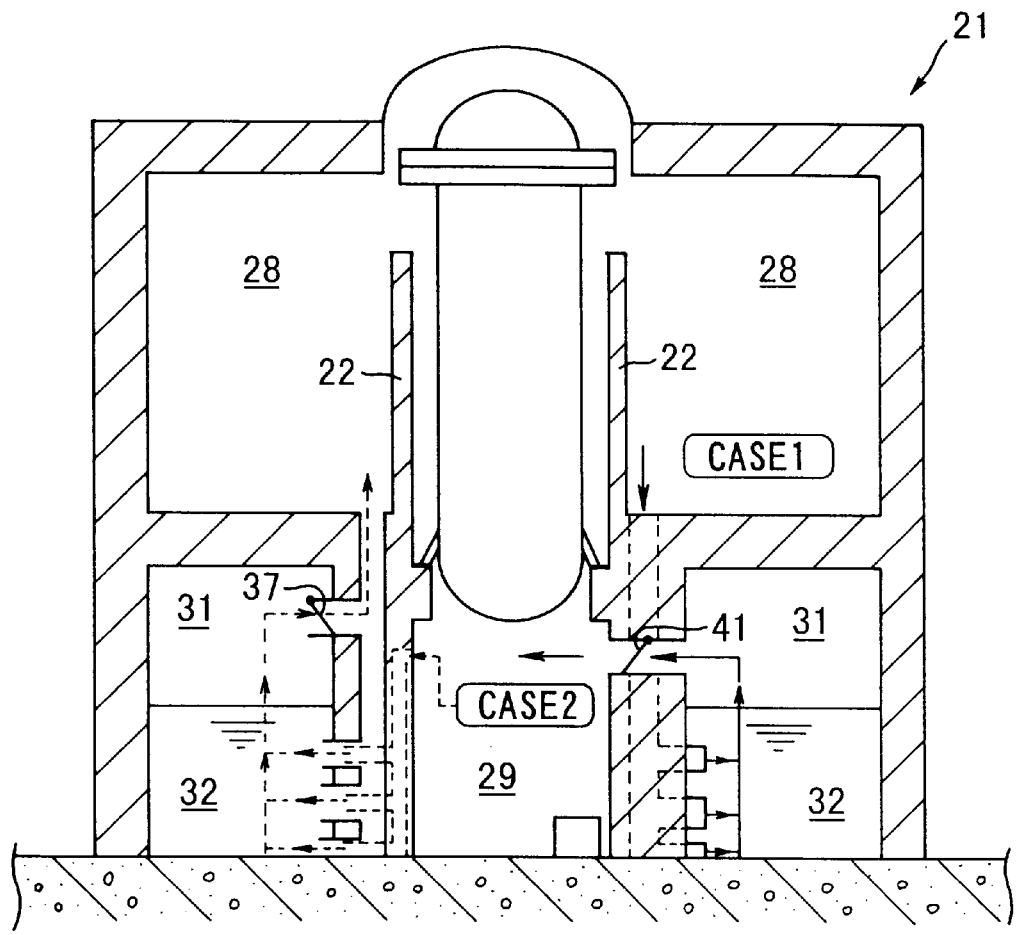
FIG. 3 is a view to explain a flow of gas in the case where an accident happens in an upper dry well and a lower dry well of the primary containment vessel according to the first embodiment of the present invention.

FIG. 3 is a view to explain a flow of gas on the assumption that an accident happens in the upper dry well 28 and the lower dry well 29 of the primary containment vessel according to the first embodiment in the following two cases.

(1) Case 1: Accident Happens in Upper Dry Well

In the case 1 where an accident such as a main steam pipe breakdown accident happens in the upper dry well 28, a steam pressure of the upper dry well 28 rises up, and then, when the steam pressure becomes a predetermined pressure or more, a steam is jetted into water stored in the suppression pool 32 via the vertical vent pipe 34 used only for the upper dry well 28 and the horizontal vent pipe 35. The jetted high pressure steam is condensed by the water of the suppression pool 32, so that an atmospheric pressure of the upper dry well 28 can be reduced.

On the other hand, the steam condensed by the water of the suppression pool 32 increases an atmospheric pressure of the gas phase section of the wet well 31 by a thermal expansion. Then, when the atmospheric pressure of the gas phase section of the wet well 31 becomes a predetermined pressure or more, the vacuum breaker 41 located in the communicating hole 40 communicating with the lower dry well 29 is released into the lower dry well 29 side. In other words, in this case, the lower dry well 29 may be regarded as a gas phase section of the wet well 31.

In the conventional primary containment vessel, a pressure analysis has been carried out in a manner that the primary containment vessel is divided into the sum of the upper dry well and the lower dry well, and the sum (V1+V2) of a free space volume V1 of the upper dry well excluding a volume of built-in pipes and equipments and a free space volume V2 of the lower dry well and a free space volume V3 of the wet well are used as one condition of the analysis.

In the case of the conventional primary containment vessel of the ABWR in the range of 1350 MWe, an error or the like on the analysis is 15% with respect to a design pressure 3.16 kg/cm$^2$g, and therefore, this is a value satisfying the design pressure. In this case, a ratio V3/(V1+V2) of a free space volume V3 of the wet well to the sum (V1+V2) of a free space volume V1 of the upper dry well and a free space volume V2 of the lower dry well was about 0.81.

In this first embodiment, if a ratio (V2+V3)/V1 of the sum (V2+V3) of a free space volume V2 of the lower dry well 29 and a free space volume V3 of the wet well 31 to a free space volume V1 of the upper dry well 28 becomes about 0.81 or more, a load acting on an outer wall of the wet well 31 is reduced. Thus, it is possible to reduce the volume of the upper dry well 28, the lower dry well 29 and the gas phase section of the wet well 31, so that the volume of the primary containment vessel 21 can be reduced.

Then, the following is a description on the analytic result made when the accident such as the above case 1 happens. In this case, the analysis target accident is a feed water pipe breakdown accident in the upper dry well 28. The analysis time is 50 seconds directly after the accident happens.

The reason why the feed water breakdown accident is recited as the analysis target is as follows. More specifically, when a feed water pipe breaks down in the upper dry well 28, a high pressure steam and water in the reactor pressure vessel 24 are discharged from the reactor pressure vessel 24 side, and further, a reactor cooling water is discharged from a turbine (not shown) side until a feed water pump (not shown) is stopped. For this reason, the quantity of water and steam discharged into the upper dry well 28 by the feed water pipe breakdown accident are greater as compared with other pipe breakdown accidents such as a main steam pipe breakdown accident or the like. Therefore, the feed water pipe breakdown accident is the most severe one of accidents happening in the upper dry well 28 in the light of a rise up of the internal pressure of the primary containment vessel 21.

Figure 4:
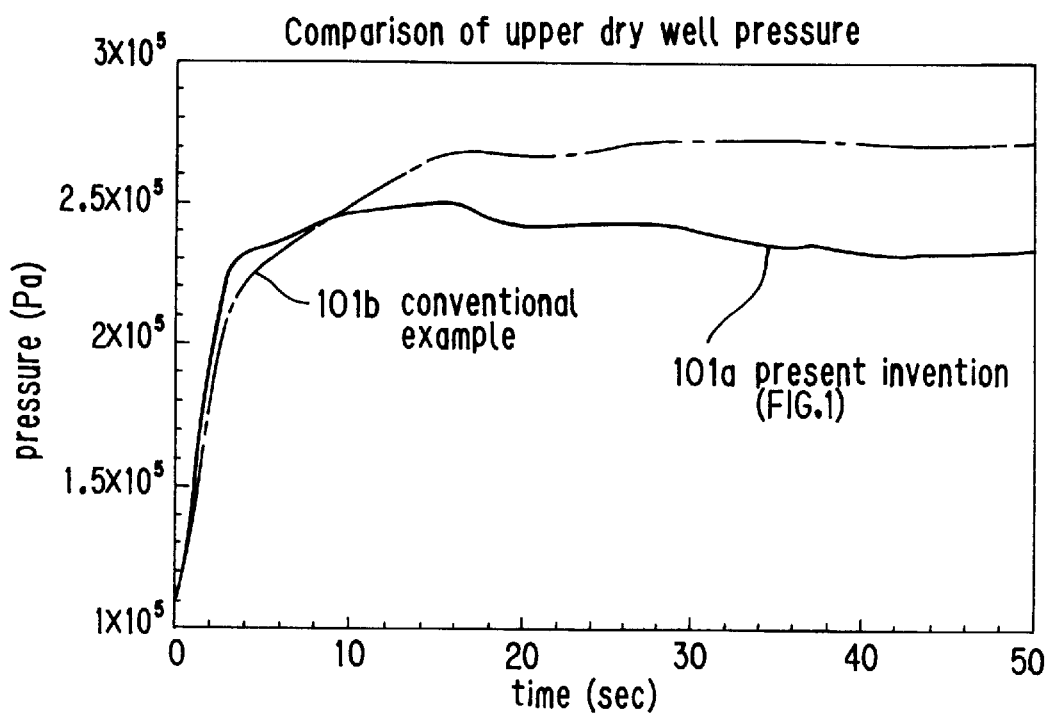
FIG. 4 is a view showing a behavior in an internal pressure of the upper dry well when a feed water pipe breakdown accident happens in the primary containment vessel according to the first embodiment of the present invention.
Figure 15:
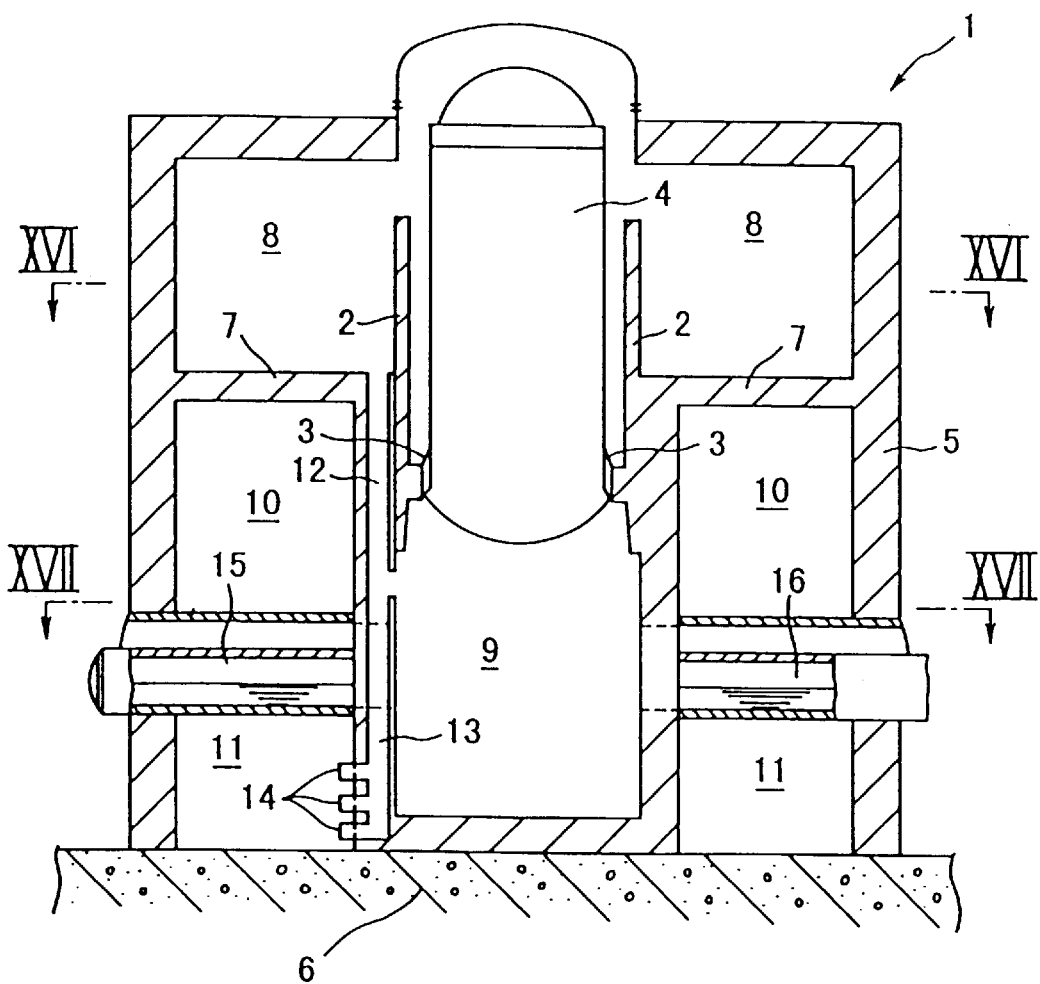
FIG. 15 is a cross sectional view schematically showing a conventional primary containment vessel of an advanced boiling water type reactor (ABWR)
Figure 16:
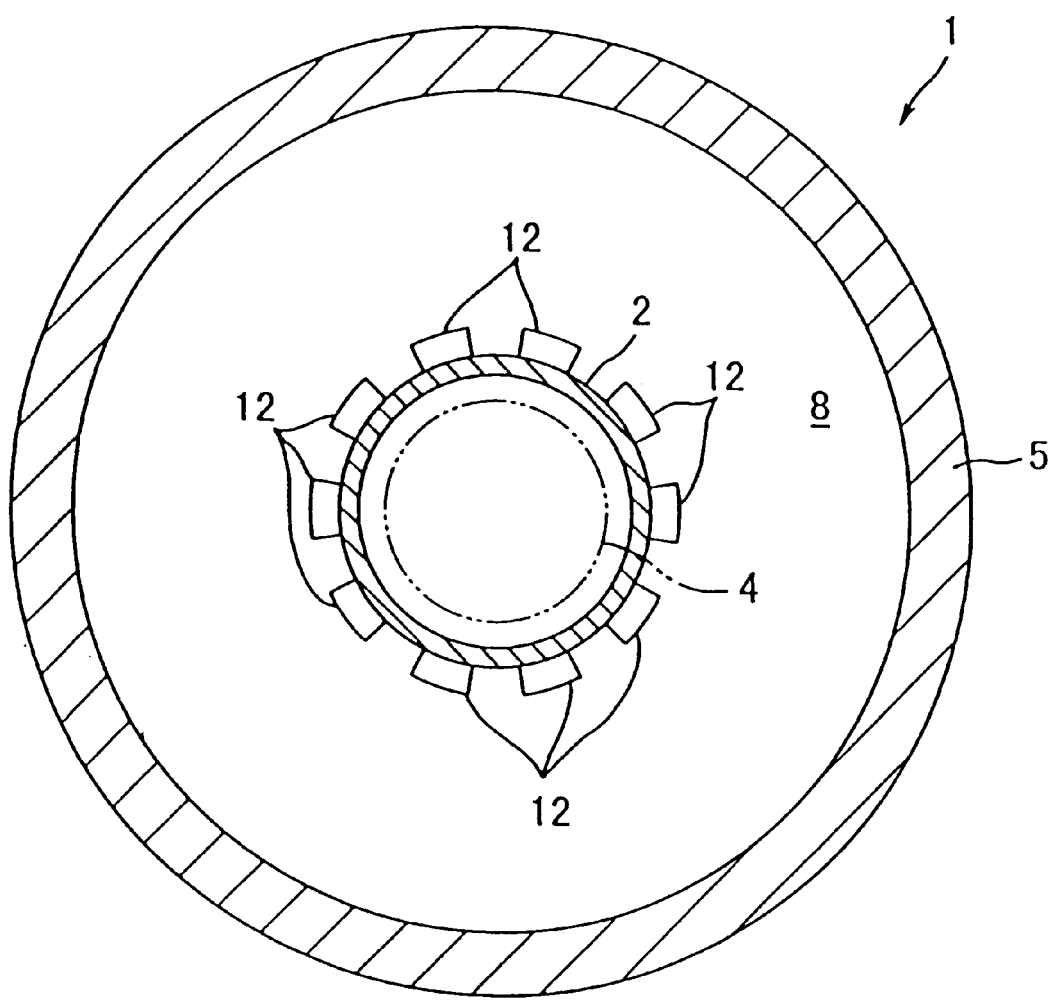
FIG. 16 is a cross sectional view taken along the line XVI—XVI of FIG. 15.
Figure 17:
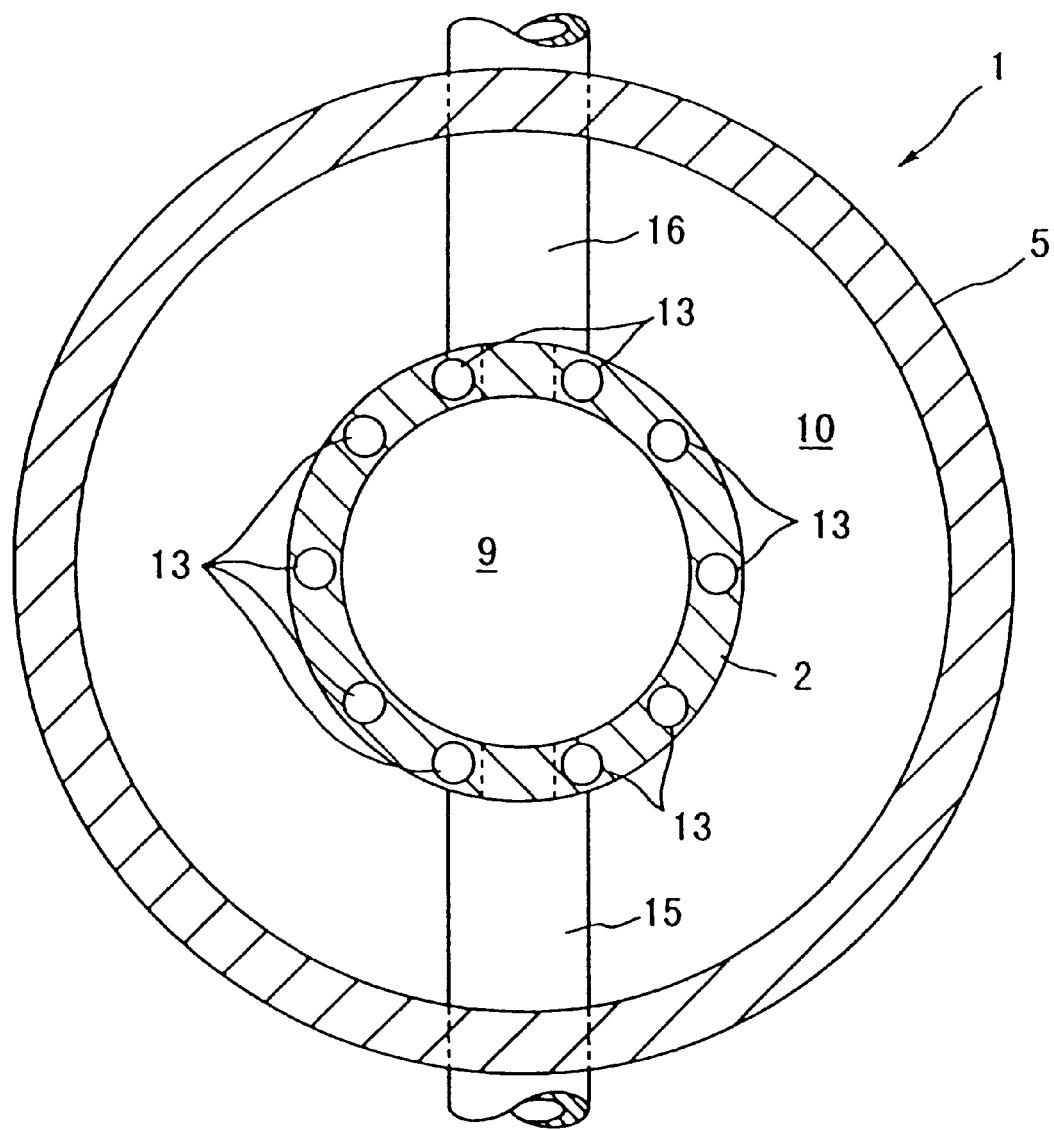
FIG. 17 is a cross sectional view taken along the line XVII—XVII of FIG. 16.

FIG. 4 shows a behavior of pressure in the upper dry well 28 when the feed water breakdown accident happens in the primary containment vessel 21 shown in FIG. 1 according to the first embodiment and in the conventional primary containment vessel 1 shown in FIG. 15. In FIG. 4, a solid line 101a shows the present invention and a broken line 101b shows the conventional case. Incidentally, a primary containment vessel of ABWR in the range of 1350 MWe is assumed as the conventional primary containment vessel 1 for the sake of convenience.

Figure 5:
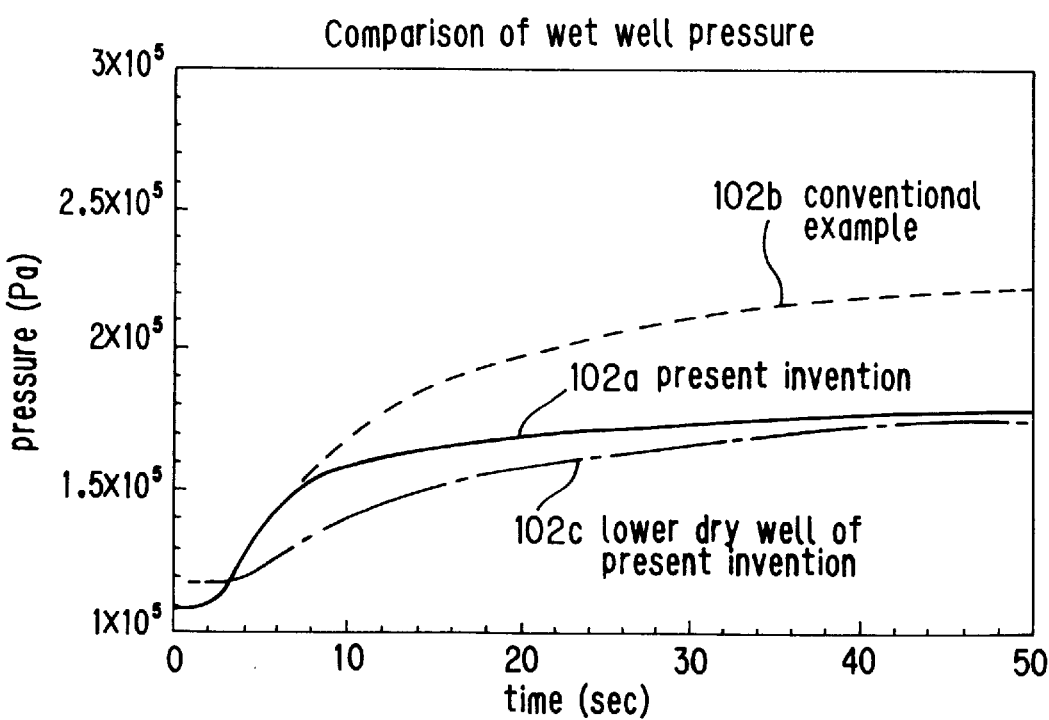
FIG. 5 is a view showing a behavior in a pressure of a gas phase section of a wet well when a feed water pipe breakdown accident happens in the primary containment vessel according to the first embodiment of the present invention.

FIG. 5 shows a behavior of pressure in the gas phase section of the wet well 31 when the feed water breakdown accident happens in two primary containment vessels 21 and 1 likewise FIG. 4. In FIG. 5, a solid line 102a shows the present invention and a broken line 102b shows the conventional case. Further, in FIG. 5, a behavior of pressure in the lower dry well 29 of the primary containment vessel 21 according the first embodiment is additionally shown by a dotted chain line 102c.

Figure 6:
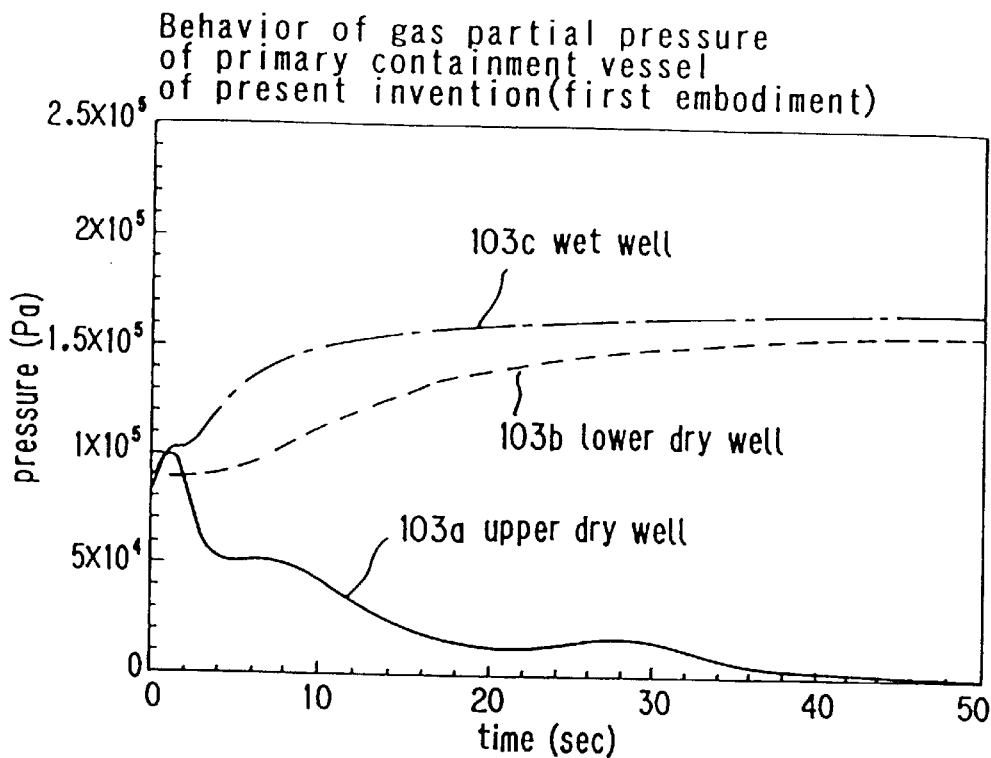
FIG. 6 is a view showing a behavior in a partial pressure of a non-condensable gas of the upper dry well, the lower dry well and the wet well when a feed water pipe breakdown accident happens in the primary containment vessel according to the first embodiment of the present invention.
Figure 7:
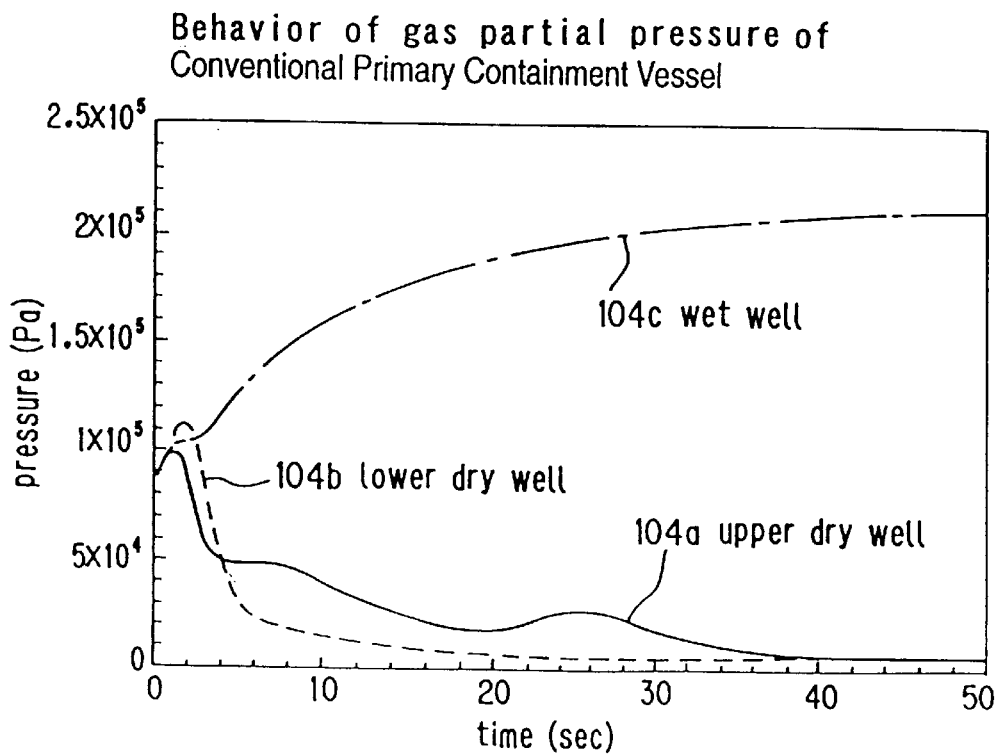
FIG. 7 is a view showing a behavior in a partial pressure of a non-condensable gas of a upper dry well, a lower dry well and a wet well when a feed water pipe breakdown accident happens in a conventional primary containment vessel.

FIG. 6 shows a behavior of partial pressure of a non-condensable gas in the upper dry well, the lower dry well and the wet well when the feed water breakdown accident happens in the primary containment vessel 21 according to the first embodiment. FIG. 7 shows a behavior of partial pressure of a non-condensable gas in the upper dry well, the lower dry well and the wet well when the feed water breakdown accident happens in the conventional primary containment vessel 1. In FIG. 6 and FIG. 7, solid lines 103a and 104a show a partial pressure of the upper dry well, broken lines 103b and 104b show a partial pressure of the lower dry well, and dotted chain lines 103c and 104c show a partial pressure of the wet well.

As shown in FIG. 4, the upper dry well pressure of the conventional primary containment vessel 1 rises up to 270 kPa at 50 seconds after the breakdown accident happens. On the contrary, in the primary containment vessel 21 according to the first embodiment, a peak pressure is about 250 kPa. Therefore, it can be seen that the rise-up quantity from the initial pressure is reduced about 13%. As shown in FIG. 5, this is because the wet well pressure of the reactor container 21 according to the first embodiment has been restrained lower as compared with the wet well pressure of the conventional primary containment vessel 1.

The following is an explanation about the reason why the wet well pressure of the primary containment vessel 21 according to the first embodiment has been restrained lower as compared with the wet well pressure of the conventional primary containment vessel 1. That is, when comparing the pressure of the lower dry well of both primary containment vessels 1 and 21, in the case of the present invention shown in FIG. 6 and FIG. 7, the non-condensable gas existing in the upper dry well flows into (is moved to) both the wet well 31 and lower dry well 29. On the other hand, in the case of the conventional case shown in FIG. 7, it can be seen that the non-condensable gas existing in the upper dry well and the lower dry well flows into the wet well.

Accordingly, in the primary containment vessels 21 of the first embodiment, the lower dry well performs a function as a wet well space in the light of a dispersion of pressure, and thus, it can be confirmed that the wet well pressure has been restrained as compared with the conventional case.

(2) Case 2: Accident Happens in Lower Dry Well

Referring again to FIG. 3, another case will be described below. In the case where an accident such as a small-diameter breakdown accident happens in the lower dry well 29, a steam pressure of the lower dry well 29 rises up, and then, when the steam pressure becomes a predetermined pressure or more, a steam (vapor) is jetted into water stored in the suppression pool 32 via the vertical vent pipe 38 used only for the lower dry well 29 and the horizontal vent pipe 39. The jetted high pressure steam is condensed by the water of the suppression pool 32, so that an atmospheric pressure of the lower dry well 29 can be reduced.

On the other hand, the steam condensed by the water of the suppression pool 32 increases an atmospheric pressure of the gas phase section of the wet well 31 by a thermal expansion. Then, when the atmospheric pressure of the gas phase section of the wet well 31 becomes a predetermined pressure or more, the vacuum breaker 37 located in the communicating hole 36 communicating with the vertical vent pipe 34 used only for the upper dry well 28 is released into the upper dry well 28 side. In other words, in this case, the upper dry well 28 may be regarded as a gas phase section of the wet well 31.

In the conventional primary containment vessel 1, as described above, a ratio V3/(V1+V2) of a free space volume V3 of the wet well to the sum (V1+V2) of a free space volume V1 of the upper dry well and a free space volume V2 of the lower dry well was about 0.81.

In this first embodiment, if a ratio (V1+V3)/V2 of the sum (V1+V3) of a free space volume V2 of the upper dry well and a free space volume V3 of the wet well to a free space volume V2 of the lower dry well becomes about 0.81 or more, a load acting on an outer wall of the wet well 31 is reduced. Thus, it is possible to reduce the volume of the upper dry well 28, the lower dry well 29 and the gas phase section of the wet well 31, so that the volume of the primary containment vessel 21 can be reduced.

According to the first embodiment, it is possible to reduce the volume of the upper dry well 28, the lower dry well 29 and the wet well 31, so that the volume of the primary containment vessel 21 can be reduced. Therefore, in a nuclear power plant construction, it is possible to reduce a cost spent in material and work, and to shorten a construction period of the plant.

Moreover, it is possible for the workers to come in the lower dry well 29 during a plant operation, and to carry out a inspection work of the equipments included in the lower dry well 29, so that the plant can be safely operated, and also, a reliability of the plant can be improved.

The primary containment vessel 21 of this first embodiment is applicable to a nuclear power plant having the same electric output as the conventional case.

Figure 8:
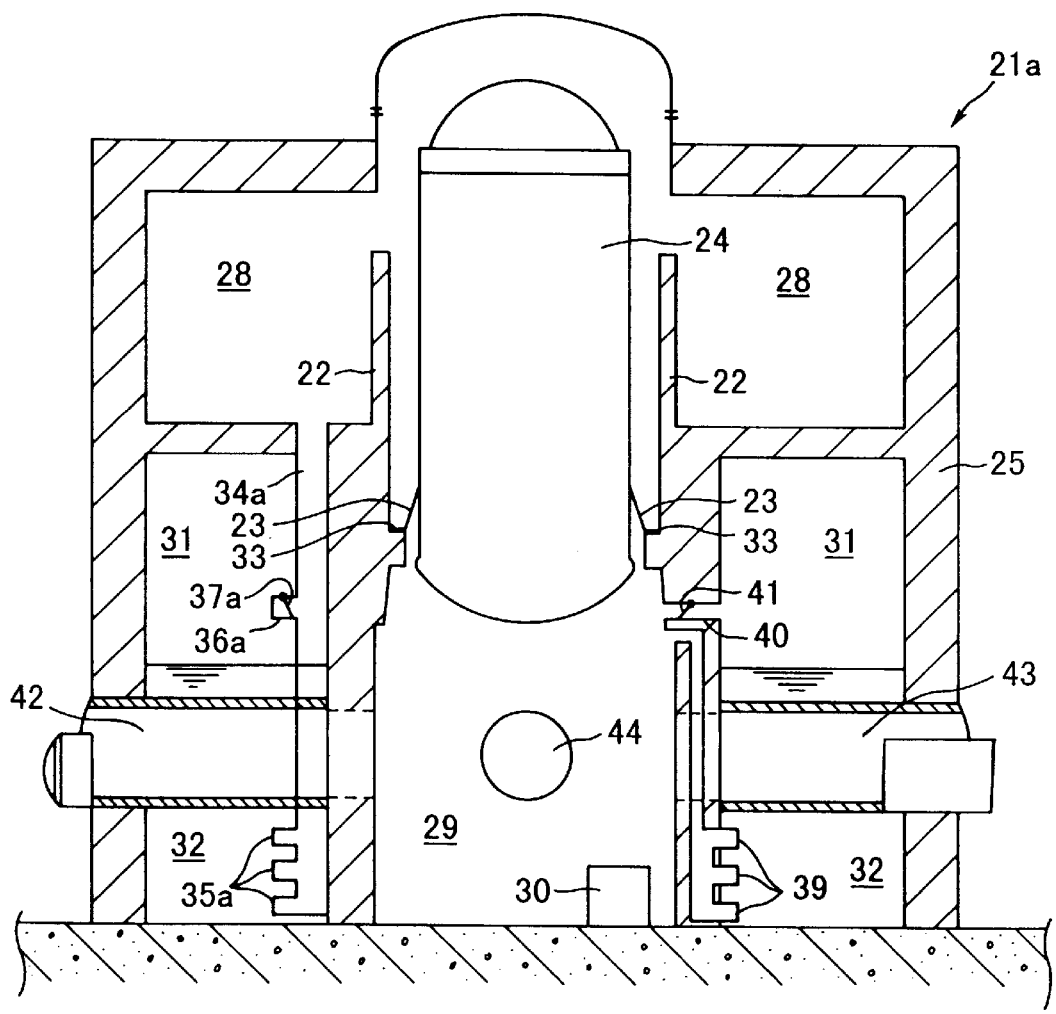
FIG. 8 is a cross sectional view schematically showing an entire structure of a primary containment vessel according to a second embodiment of the present invention.

Second Embodiment (FIG. 8)

FIG. 8 is a cross sectional view schematically showing the whole construction of a primary containment vessel according to a second embodiment of the present invention.

This second embodiment is different from the first embodiment in that an outer peripheral side of a RPV pedestal is provided with a vertical vent pipe used only for the upper dry well and a horizontal vent pipe. Other construction is the same as that of the first embodiment. Therefore, like reference numerals are used to designate the same components as the first embodiment and the details thereof are omitted.

In a primary containment vessel 21a of this second embodiment, as shown in FIG. 8, an outer peripheral side of the RPV pedestal 22 is provided with a vertical vent pipe 34a, which is opened to the upper dry well side at the upper end portion thereof, as a vent pipe used only for the upper dry well 28. The vertical vent pipe 34a is connected to a plurality of horizontal vent pipes 35a at a lower end portion thereof, and the horizontal vent pipes 35a are opened to the water stored in a suppression pool 32.

The vertical vent pipe 34a used only for the upper dry well 28 is provided with a communicating hole 36a which communicates a gas phase section of the wet well 31 with the upper dry well 28. The communicating hole 36a is provided with a vacuum breaker 37a which functions as a high pressure gas inflow means. The vacuum breaker 37a selectively allows an inflow of an excessively high pressure gas of the gas phase section of the wet well 31 into the upper dry well 28 in an emergency.

Moreover, in this second embodiment, the vertical vent pipe 38 used only for the lower dry well 29 and the horizontal vent pipe 39 have been provided in the RPV pedestal 22. The outer peripheral side of the RPV pedestal 22 may be provided with a vent pipe used only for the lower dry well 29.

According to this second embodiment, in addition to the same effects as those of the first embodiment, there is no need of providing the vertical vent pipe 34a used only for the upper dry well 28 and the horizontal vent pipe 35a in the RPV pedestal 22, so that the construction of the primary containment vessel can be simplified.

Figure 9:
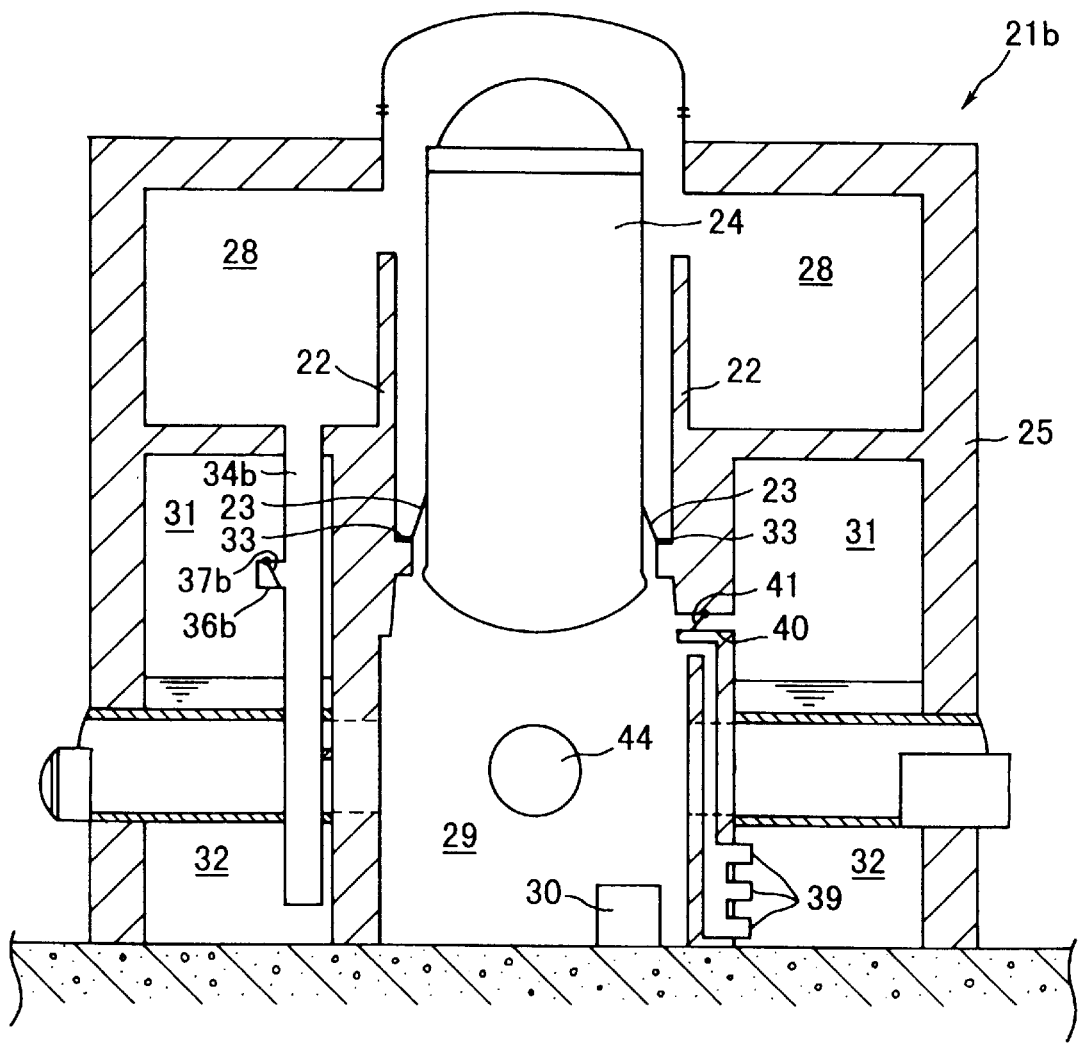
FIG. 9 is a cross sectional view schematically showing an entire structure of a primary containment vessel according to a third embodiment of the present invention.

Third Embodiment (FIG. 9)

FIG. 9 is a cross sectional view schematically showing the whole construction of a primary containment vessel according to a third embodiment of the present invention.

This third embodiment is different from the first embodiment in that an outer peripheral side of a RPV pedestal is provided with a vertical vent pipe used only for the upper dry well. Other construction is the same as that of the first embodiment. Therefore, like reference numerals are used to designate the same components as the first embodiment and the details thereof are omitted.

In a primary containment vessel 21b of this third embodiment, as shown in FIG. 9, an outer peripheral side of the RPV pedestal is provided with a vertical vent pipe 34b, which is opened to the upper dry well side at the upper end portion thereof, as a vent pipe used only for the upper dry well 28. The vertical vent pipe 34b is opened to the water stored in a suppression pool 32 at a lower end portion thereof.

The vertical vent pipe 34b used only for the upper dry well 28 is provided with a communicating hole 36b which communicates a gas phase section of the wet well 31 with the upper dry well 28. The communicating hole 36b is provided with a vacuum breaker 37b which functions as a high pressure gas inflow means. The vacuum breaker 37b selectively allows an inflow of an excessively high pressure gas of the gas phase section of the wet well 31 into the upper dry well 28 in an emergency.

According to this third embodiment, in addition to the same effect as the second embodiment, no horizontal vent pipe used for only upper dry well 28 is required, so that the construction of the primary containment vessel can be simplified.

Figure 10:
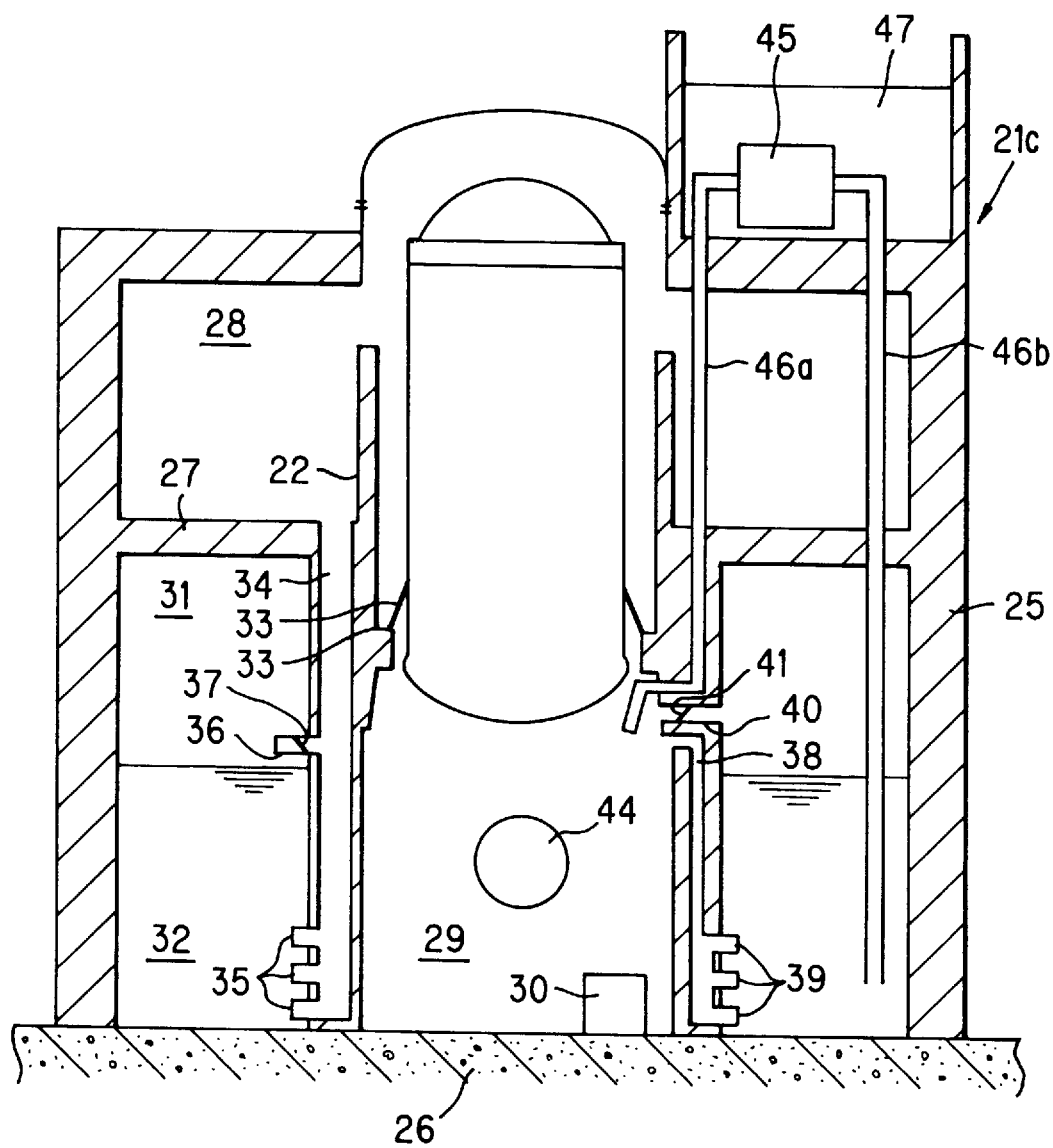
FIG. 10 is a cross sectional view schematically showing an entire structure of a primary containment vessel according to a fourth embodiment of the present invention.

Fourth Embodiment (FIG. 10)

FIG. 10 is a cross sectional view schematically showing the whole construction of a primary containment vessel according to a fourth embodiment of the present invention.

This fourth embodiment is different from the first embodiment in that a passive containment cooling system (hereinafter, referred simply to as PCCS) is additionally provided as a primary containment vessel cooling system. Other construction is the same as that of the first embodiment. Therefore, like reference numerals are used to designate the same components as the first embodiment and the details thereof are omitted.

A primary containment vessel 21c of this fourth embodiment is provided with a heat exchanger 45 which is located outside the outer concrete wall 25 and condenses a steam, a pipe 46a which communicates the heat exchanger 45 with the lower dry well 29, and a pipe 46b which communicates the heat exchanger 45 with the wet well 31. The pipe 46a is opened to the lower dry well 29, and on the other hand, the pipe 46b is opened to the water stored in the suppression pool 32 of the wet well 31.

The pipe 46a guides a steam generated in the lower dry well 29 to the heat exchanger 45 when an accident happens. The heat exchanger 45 makes a heat exchange with the water stored in a PCCS pool 47 located on the outside of the primary containment vessel 21c, thus the steam generated in the lower dry well 29 being condensed. The pipe 46b guides a condensation water condensed by the heat exchanger 45 into the water stored in the suppression pool 32 of the wet well 31.

The PCCS is a passive containment cooling system which does not use dynamic equipments such as a pump or the like and uses only natural force and the PCCS is operable under the condition of a case that it is difficult to use dynamic equipments by the occurrence of a severe accident or the like.

Therefore, according to this fourth embodiment, in addition to the same effects as those described in the first embodiment, it is possible to further improve safety of the primary containment vessel even in the case where a severe accident or the like happens.

The following is a description on an analysis result of an behavior in the primary containment vessel 21c of the fourth embodiment when a severe accident happens such that the reactor pressure vessel breaks down, and a melted reactor core flows into the lower dry well, and further, a main steam pipe breaks down. In this analysis case, an extremely rare accident of severe accidents is recited as an example, and more specifically, a loss of coolant accident (LOCA) happens in the upper dry well 28, and then, a reactor core is melted and flows into the lower dry well 29. Further, the main steam pipe and the reactor pressure vessel break down, and for this reason, a passage connecting the upper and lower dry wells. As a result, this analysis case is considered as a case of most reducing a dry well division effect according to the present invention.

In this case, the analysis time is ten hours after a containment spray is operated (after five hours elapsed just from the occurrence of an accident). Thus, the containment spray is carried out for 30 minutes just after a calculation is started.

Figure 11:
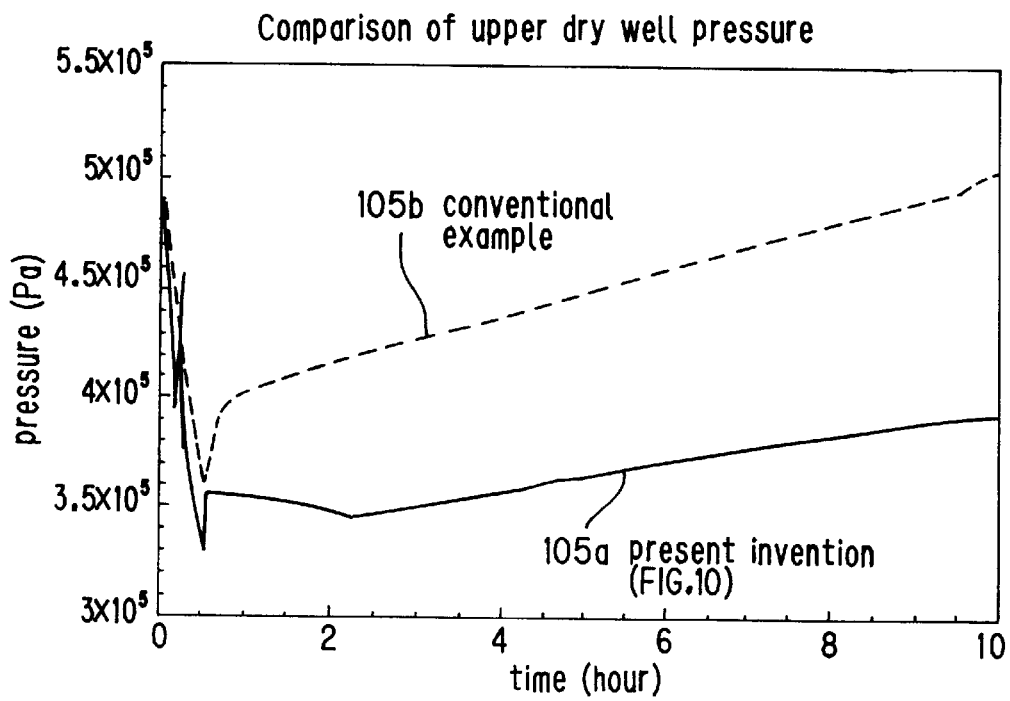
FIG. 11 is a view showing a behavior in an internal pressure of an upper dry well when a loss of coolant accident (LOCA) happens in the primary containment vessel according to the fourth embodiment of the present invention.
Figure 12:
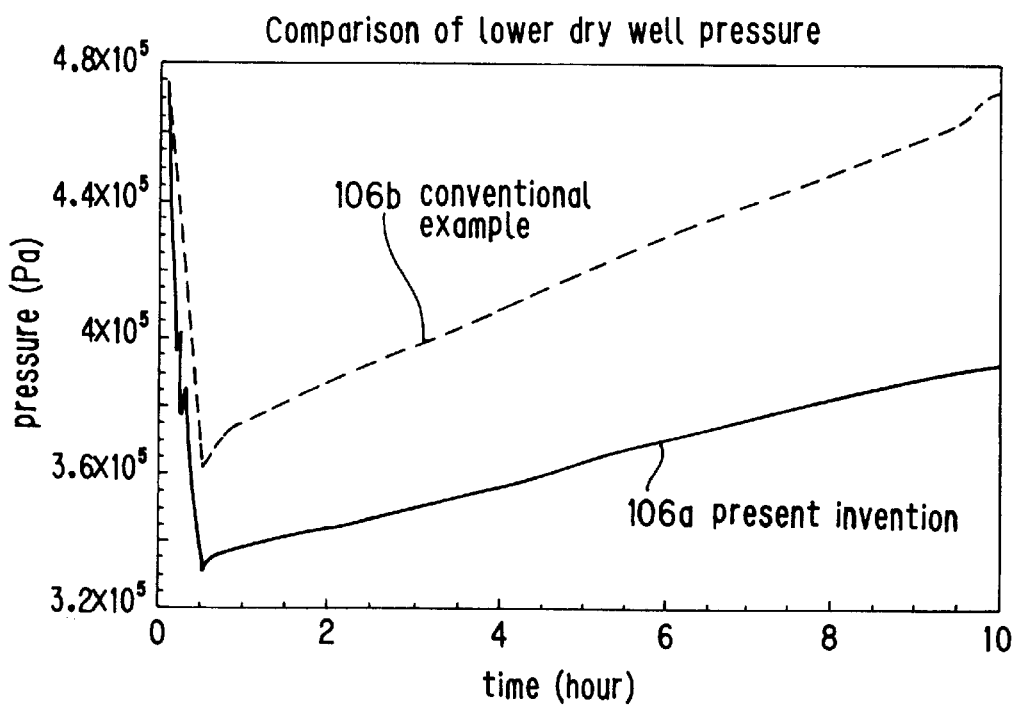
FIG. 12 is a view showing a behavior in an internal pressure of a lower dry well when a loss of coolant accident (LOCA) happens in the primary containment vessel according to the fourth embodiment of the present invention.

FIG. 11 shows a behavior of a pressure of the upper dry well 28 when a loss of coolant accident (LOCA) in the primary containment vessel 21c of the fourth embodiment shown in FIG. 10 and the conventional primary containment vessel 1 shown in FIG. 15. FIG. 12 shows a behavior of a pressure of the lower dry well 29 when a loss of coolant accident (LOCA) in the primary containment vessel 21c and the conventional primary containment vessel 1. In these FIG. 11 and FIG. 12, solid lines 105a and 106a show the present invention, and broken lines 105b and 106b show the conventional case.

Figure 13:
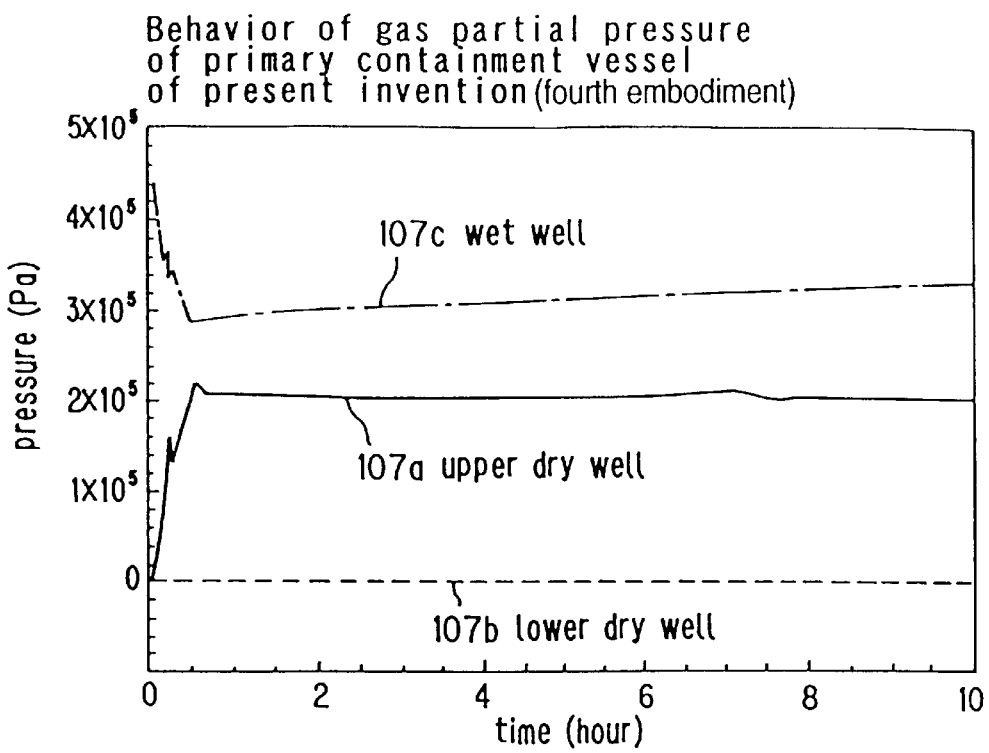
FIG. 13 is a view showing a behavior in a partial pressure of the upper dry well, the lower dry well and a wet well when a loss of coolant accident (LOCA) happens in the primary containment vessel according to the fourth embodiment of the present invention.
Figure 14:
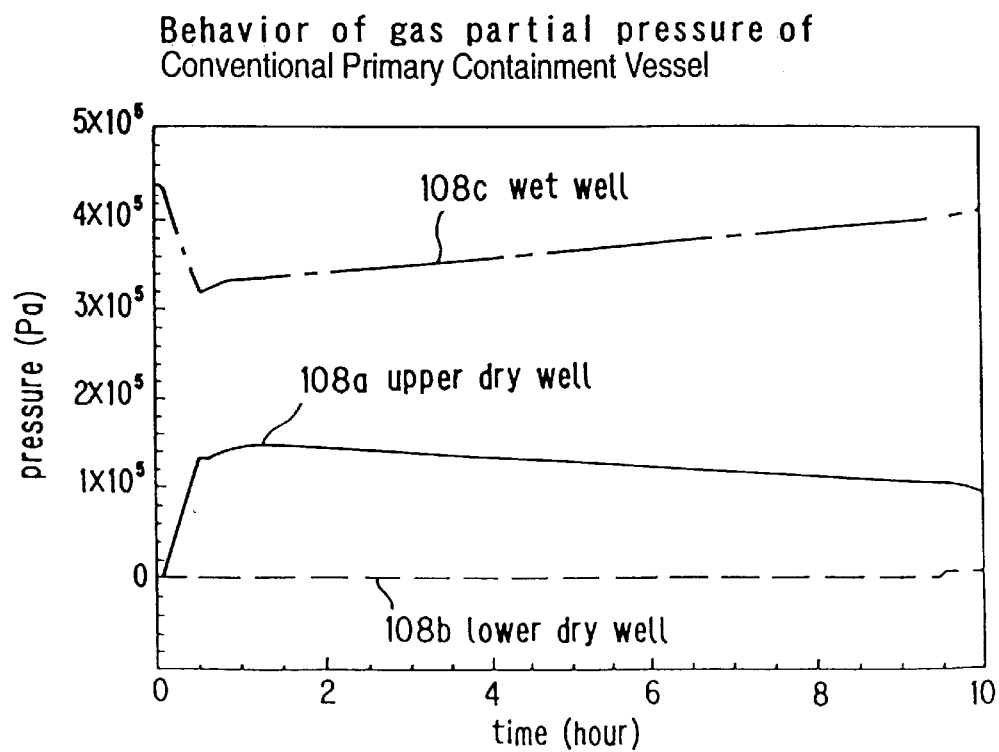
FIG. 14 is a view showing a behavior in a partial pressure of the upper dry well, the lower dry well and the wet well when a loss of coolant accident (LOCA) happens in a conventional primary containment vessel.

FIG. 13 shows a behavior of a non-condensable gas of the upper dry well, the lower dry well and the wet well of the primary containment vessel 21c according to the fourth embodiment. FIG. 14 shows a behavior of a non-condensable gas of the upper dry well, the lower dry well and the wet well of the conventional primary containment vessel 1. In these FIGS. 13 and 14, solid lines 107a and 108a show a partial pressure of the upper dry well, broken lines 107b and 108b show a partial pressure of the lower dry well, and dotted chain lines 107c and 108c show a partial pressure of the wet well.

As seen from FIG. 11, the pressures of the upper dry wells of both the primary containment vessel 1 and 21c are respectively lowered to 360 kPa and 330 kPa by means of the containment spray which has been carried out for 30 minutes just after a calculation is started. However, the pressure of the conventional primary containment vessel 1 rises up to about 500 kPa after ten hours elapsed, and on the contrary, the pressure of the primary containment vessel 21c of this fourth embodiment is about 390 kPa. Therefore, in the primary containment vessel of this fourth embodiment, the pressure rise-up is restrained to about 57% as compared with the conventional case. This is because the wet well pressure of the primary containment vessel 21c of the fourth embodiment is restrained lower than the wet well pressure of the conventional primary containment vessel 1, as seen from FIG. 12.

The following is an explanation about the reason why the wet well pressure of the primary containment vessel 21c of the fourth embodiment is restrained lower than the wet well pressure of the conventional primary containment vessel 1. As seen from FIGS. 13 and 14, the pressure of the upper dry well is lowered by means of the containment spray which has been operated for 30 minutes just after a calculation is started. For this reason, a non-condensable gas in the wet well passes through the vacuum breaker, and then, flows into the upper dry well. Thereafter, in the dry well of the fourth embodiment, the non-condensable gas, which has flown into the upper dry well, is left alone in the upper dry well. On the contrary, in the case of the conventional primary containment vessel, the non-condensable gas, which has flown into the upper dry well, is again returned to the wet well, and as a result, the wet well pressure rises up. For this reason, in the conventional primary containment vessel 1, the pressure rise-up after a predetermined time elapsed is great as compared with the primary containment vessel 21c of the fourth embodiment.

As is evident from the above explanation, it can be confirmed that the internal pressure of the primary containment vessel 21c of the fourth embodiment is restrained lower than the conventional case when a sever accident happens.

As described above in detail, according to the primary containment vessel of the present invention, the upper dry well and the lower dry well are effectively used, and it is therefore possible to meet a request to increase an electric output of a nuclear power plant and to make a primary containment vessel into a compact size by means of a safely and relatively simple structure or arrangement. Furthermore, since the primary containment vessel is made into a compact size, it becomes possible to reduce a cost for constructing the nuclear power plant and to improve economics on a practical operation of the nuclear power plant.

It is to be noted that the present invention is not limited to the described embodiments and many other changes and modifications may be made without departing from the scopes of the appended claims.

What is claimed is:

1. A primary containment vessel, which contains a reactor pressure vessel, pipe means of a reactor water recirculation system, other reactor systems and equipments, comprising:
   an outer peripheral concrete wall surrounding the reactor pressure vessel, the pipe means of the reactor water recirculation system and the other reactor systems and equipments;
   a mat concrete wall positioned, in an installed state, below the outer peripheral concrete wall so as to support the outer peripheral concrete wall;
   a reactor pressure vessel (RPV) pedestal supporting the reactor pressure vessel at a substantially vertically central position of the outer peripheral concrete wall;
   a horizontal wall joining the outer peripheral concrete wall and the RPV pedestal at substantially the vertically central position of the RPV pedestal;
   an upper dry well surrounded by the outer peripheral concrete wall, the horizontal wall, the RPV pedestal and the reactor pressure vessel;
   a lower dry well positioned below the reactor pressure vessel and surrounded by the mat concrete wall, the RPV pedestal and the reactor pressure vessel;
   a wet well having a suppression pool in which water is stored;
   isolating means provided with a sealing material for air-tightly isolating the upper dry well and the lower dry well at a position supporting the reactor pressure vessel;
   vent pipe means exclusively used for the upper dry well, which communicates the upper dry well with the suppression pool;
   high pressure gas inflow means used for the upper dry well, which is located in a communicating hole formed to the RPV pedestal so as to communicate the vent pipe means used for the upper dry well with a gas phase section of the wet well to isolate the gas phase section of the wet well from the upper dry well during normal operating conditions and selectively allow a gas inflow to the upper dry well from the gas phase section of the wet well when a gas pressure in the gas phase section of the wet well becomes more than a predetermined value;
   another vent pipe means exclusively used for the lower dry well, which communicates the lower dry well with the suppression pool; and
   another high pressure gas inflow means used for the lower dry well, which is located in a communicating hole formed to the RPV pedestal so as to communicate the lower dry well with a gas phase section of the wet well to isolate the gas phase section of the wet well from the lower dry well during normal operating conditions and selectively allow a gas inflow to the lower dry well from the gas phase section of the wet well when a gas pressure in the gas phase section of the wet well becomes more than a predetermined value.

2. A primary containment vessel according to claim 1, wherein said vent pipe means used for the upper dry well includes a vertical vent pipe which is vertically located in the RPV pedestal and is opened to the upper dry well side at an upper end portion thereof and a horizontal vent pipe which is connected to a lower end side of the vertical vent pipe and is opened to the water stored in the suppression pool.

3. A primary containment vessel according to claim 1, wherein said vent pipe means used for the upper dry well is a vertical vent pipe which is located on an outside of the RPV pedestal and has an upper end opened to the upper dry well side and a lower end opened to the water stored in the suppression pool.

4. A primary containment vessel according to claim 1, wherein said vent pipe means for the upper dry well includes a vertical vent pipe which is located on an outer peripheral side of the RPV pedestal and is opened to the upper dry well side at an upper end portion thereof and a horizontal vent pipe which is connected to a lower end side of the vertical vent pipe and is opened to the water stored in the suppression pool.

5. A primary containment vessel according to claim 1, wherein said another vent pipe means used for the lower dry well includes a vertical vent pipe which is vertically located in the RPV pedestal and is opened to the lower dry well side at an upper end portion thereof and a horizontal vent pipe which is connected to a lower end side of the vertical vent pipe and is opened to the water stored in the suppression pool.

6. A primary containment vessel according to claim 1, wherein said another vent pipe means for the lower dry well includes a vertical vent pipe which is located on an outer peripheral side of the RPV pedestal and is opened to the lower dry well side at an upper end portion thereof and a horizontal vent pipe which is connected to a lower end side of the vertical vent pipe and is opened to the water stored in the suppression pool.

7. A primary containment vessel according to claim 1, wherein said high pressure inflow means used for the upper dry well is composed of a vacuum breaker.

8. A primary containment vessel according to claim 1, wherein said another high pressure inflow means used for the lower dry well is composed of a vacuum breaker.

9. A primary containment vessel according to claim 1, wherein said lower dry well is provided with an air conditioner used for a cooling equipment included in the lower dry well.

10. A primary containment vessel according to claim 1, wherein said lower dry well has a structure to be filled with an atmospheric air so as to provide a working space in which workers breath.

11. A primary containment vessel according to claim 1, further comprising:

heat exchanger means located outside the outer peripheral concrete wall;

cooling means located outside the outer peripheral concrete wall to cool a heat of the heat exchanger means;

pipe means connecting an inlet portion of the heat exchanger means and the lower dry well; and another pipe means connecting an outlet portion of the heat exchanger means and the wet well and being opened to a water phase section of the wet well.

12. A primary containment vessel according to claim 1, where in the primary containment vessel is further provided with an equipment carrying passageway which penetrates through the outer peripheral concrete wall, the wet well and the RPV pedestal and through which various equipments are carried in and out the lower dry well, a personnel passageway for workers which penetrates through the outer peripheral concrete wall, the wet well and the RPV pedestal and is constructed in a manner that the workers come in and out in order to do work in the lower dry well, and an equipment passageway which penetrates through the outer peripheral concrete wall, the wet well and the RPV pedestal and includes various pipes and cables for the lower dry well.

13. A primary containment vessel according to claim 12, wherein said equipment passageway is arranged at a predetermined angle on a horizontal plane with respect to the equipment carrying passageway and the personnel passageway.

14. A primary containment vessel according to claim 12, wherein said lower dry well includes a reactor water recirculation pump and a control rod drive mechanism, and said equipment passageway is provided with a heat exchanger cooling pipe of the reactor water recirculation pump, an electric cable of the control rod drive mechanism, other electric cables of equipments included in the lower dry well and a cooling water pipe to the air conditioner used for the cooling equipments included in the lower dry well.

* * * * *